United States Patent [19]

Henkel

[11] Patent Number: 4,788,819

[45] Date of Patent: Dec. 6, 1988

[54] APPARATUS FOR REMOVING SOOT FROM THE EXHAUST GASES OF AN INTERNAL COMBUSTION ENGINE, IN PARTICULAR A DIESEL ENGINE

[75] Inventor: Dietmar Henkel, Neumarkt, Fed. Rep. of Germany

[73] Assignee: MAN Nutzfahrzeuge GmbH, Munich, Fed. Rep. of Germany

[21] Appl. No.: 108,734

[22] Filed: Oct. 14, 1987

[30] Foreign Application Priority Data

Oct. 15, 1986 [DE] Fed. Rep. of Germany ....... 3635038

[51] Int. Cl.$^4$ .............................................. F01N 3/02
[52] U.S. Cl. ........................................ 60/303; 60/275;
60/311; 55/466; 55/474; 55/512
[58] Field of Search .................... 60/311, 303, 275;
55/466, 523, DIG. 30, 512, 474

[56] References Cited

U.S. PATENT DOCUMENTS

| | | | |
|---|---|---|---|
| 3,094,394 | 6/1963 | Innes | 55/512 |
| 3,389,971 | 6/1968 | Alliger | 60/275 |
| 4,404,795 | 9/1983 | Oishi | 55/DIG. 30 |

*Primary Examiner*—Douglas Hart
*Attorney, Agent, or Firm*—Becker & Becker, Inc.

[57] ABSTRACT

An apparatus for removing soot from the exhaust gases of an internal combustion engine using a loose material filter. The object is to confine the loose material in a particularly effective manner so as to produce a very high degree of soot separation in the filter. This is achieved essentially in that the (loose material) fixing element is composed of two vertically and coaxially disposed perforated tube members that form a first annular chamber, with those surfaces of the perforated tube members that face the first annular chamber being each provided with a fine-mesh screen and adjacent thereto, a coarse mesh screen. The exhaust gas passes through the filter insert transverse to the gravitational effect of the granulate particles. To compact the granulate fill, the first annular chamber can be charged with compressed air via a second annular chamber that is adjacent thereto and is provided in the upper region of the filter housing.

7 Claims, 2 Drawing Sheets

APPARATUS FOR REMOVING SOOT FROM THE EXHAUST GASES OF AN INTERNAL COMBUSTION ENGINE, IN PARTICULAR A DIESEL ENGINE

BACKGROUND OF THE INVENTION

The present invention relates to an apparatus for removing soot or particulates from the exhaust gases of an internal combustion engine, especially a Diesel engine.

Applicant's copending U.S. patent application, Ser. No. 069,609, filed July 2, 1987, discloses an apparatus of this general type, which includes a metallic housing with inlet and outlet connectors for the exhaust gas stream, and a filter insert that is disposed in the housing and contains a nonmetallic, high-temperature-resistant filter means in the form of a granulate fill that is disposed in a fixing element, wherein the filter insert in the filter housing separates a crude or untreated-gas chamber from a purified-gas chamber, and an electrical current source is used for burning off, in a controlled manner, the soot deposited on the filter means. This copending application Ser. No. 069,609 is incorporated into this disclosure by this reference thereto.

According to the aforementioned application Ser. No. 069,609, the soot itself acts as an electrical conductor of heat. Surface filters (for example yarn or fabric filters) or deep bed filters (for example loose material or granulate filters) can be used.

Surface filters run the risk of receiving combustion residues, such as ash. On the other hand, such ash particles merely increase the volume of granulate filters, provided that they have not previously been discharged by the exhaust gas that flows through the looser granulate structure. However, granulate filters produced with the normal loose fill generally necessitate a large volume of loose material and therefore a considerable weight, which (often) makes them unsuitable for use in vehicle engines.

The reason for the large volume required by loose material filters is the relatively long average path which the respective soot-laden exhaust gas has to cover in the granulate to achieve a certain desired probability of separation of the soot contained.

The abovementioned "separation path length" is directly dependent on the average granule size if the effect of the exhaust gas speed in the fill is disregarded. This is related to the fact that an increase in the diameter of the granule particles also means an increase in the cross section of the average free microscopic passage for the exhaust gas; in the long run, this causes a drop in the separating capacity, which can then be improved only with a greater fill height (corresponding to a greater separating path length).

The conclusion reached, involving selecting granule particle sizes having smaller diameters when dimensioning the filter, has limits in that the accompanying requirement for a reduction in the gas throughout (to avoid discharge losses) leads to an enlargement of the perforated exhaust gas intake base.

A smaller fill height and, at the same time, an enlarged inlet surface and smaller granule diameter, follow a law that does not lead to the expected reduction in volume and therefore in weight, which is a condition for use of the loose material filter in vehicles.

One way of enabling lower weight granulate structures to be used for producing a deep bed filter design involves confining the fill.

The basic idea is as follows: With (conventional) granulate filters, the permitted volumetric flow per unit of passage area is largely dependent on a specific value of the ratio between the two forces acting on the individual grain of loose material during operation. This includes the tractive force (acting against gravity) which acts on the grain surface, is dependent on the flow rate, and counteracts the weight of the same grain. If the tractive force exceeds the weight (force ratio exceeds 1), the grain is discharged in an undesirable manner. On the other hand, if a discharge barrier in the form of a screen is provided, this barrier allows considerably higher flow rates inside the filter up to a pressure drop value which can just be tolerated as a counterpressure component of the exhaust gas stream from the engine. It can easily be seen that such a filter is distinguished by a comparatively low loose material requirement, and is thus suitable for vehicles.

The object of the invention is to provide a relatively simple means for confining loose material which works particularly well, is reliable in operation, and produces a very high degree of soot separation in the filter using a soot filter of the aforementioned general type.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
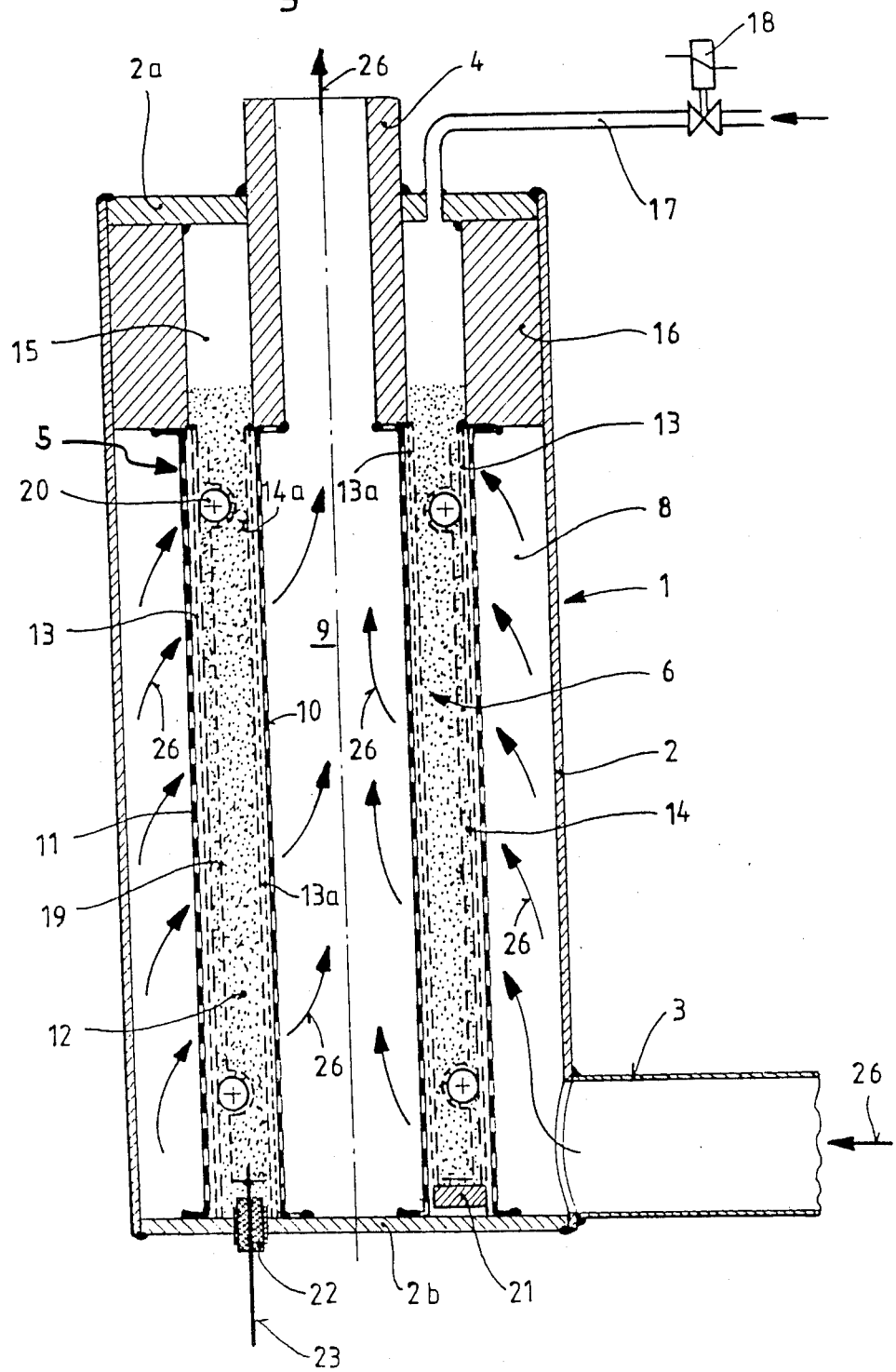
FIG. 1 is a longitudinal cross-sectional view through one exemplary embodiment of a loose material filter according to the invention.

The apparatus of the present invention is characterized primarily in that the fixing element comprises two vertically and coaxially disposed perforated tube members that form a first annular chamber, with those surfaces of the perforated tube members that face the first annular chamber being each equipped with a fine-mesh screen and, adjacent thereto a coarse-mesh screen, the exhaust gas flowing through the filter insert transverse to the gravitational force of the particles of granulate, and in which, for compacting the granulate fill, the first annular chamber can be charged with compressed air via a second annular chamber that is adjacent to the first annular chamber and is provided in the upper region of the filter housing.

The invention allows double confinement of the loose material, first by the screen inserts and second by the compressed air charge. This effect is further enhanced by the special arrangement or design of the filter insert, and by the exhaust gas guide means described. In this way, the pressure drop in the fill produced by the exhaust gas is prevented from loosening the fill, which would adversely affect the degree of soot separation.

In a further embodiment of the invention, the overpressure is supplied to the second annular chamber by means of pressure reducers of conventional design and via a line. If the shaking movements produced by the natural mechanical vibrations of the exhaust, and by the pressure harmonics of the exhaust gas, are not sufficient to prevent plug formation during the build up of compressed air in the granulate, assistance can be provided by means of an ultrasonic oscillator which is tuned to resonance and is arranged on the base plate of the filter housing by means of a solid state wave guide. If the soot and ash charge in the exhaust gas have caused an undesirable increase in the flow resistance of the filter due to pore constriction, the volume of granulate can be loosened and therefore expanded by checking the compressed air supply using a solenoid valve (with a simultaneously started ultrasonic oscillator). The granulate fill is then re-compacted as the result of a renewed pressure charge, with the ultrasonic oscillator remaining switched on for the duration of the momentary shaping process. This process can be controlled, for example, by a metal bellows-type pressure pickup which is controlled by a spring and initiates the chain of effect: stop compressed air - start ultrasonic oscillators-upply compressed air - switch off ultrasonic oscillator - when a critical exhaust gas counter pressure is exceeded (closure of a contact).

For electrical soot removal by the process according to Ser. No. 069,609, the first annular chamber, which is filled with granulate, is provided with a voltage-guiding screen cylinder electrode (composed of coarse-mesh wire) which is arranged in the vicinity of the inlet side (the peak of soot removal lies here) and is fixed in position by means of insulating spacers (for example balls). This screen cylinder electrode is connected via an electrical conductor, which is fed through an insulator in the filter housing base plate, to an electrical supply unit. Plate-shaped spacers (composed either of individual parts or of a single encircling part) of ceramic material serve to release the pressure of the insulator.

The coarse-mesh screen adjacent to the fine screen advantageously assumes the electrode function for the ground potential of the applied current source. The coarse-mesh screen is designed in such a way that the passage of the electrical field lines to the fine screen (which would lead to destruction thereof) is almost entirely eliminated.

Further advantages can be achieved by inserting a varistor in the discharge path of a surge unit; this serves to force time forming of the discharge current in order to prevent destruction of granulate or electrode material by heat.

DESCRIPTION OF PREFERRED EMBODIMENTS

Referring now to the drawings in detail, the soot or particulate filter 1 includes a filter housing 2 that is composed of a cylindrical sheet metal casing which is sealed at both ends by end plates 2a and 2b. The plate 2a forms the top plate, and the plate 2b forms the base plate. A filter insert 5 is provided in the interior of the housing 2. The filter insert 5 is formed by having two vertically and coaxially arranged perforated tube members 10 and 11 form a fixing element for a fine-grained granulate fill 6. The fill (of a nonconductive, heat-resistant material, for example $SiO_2$) is disposed in a first circular chamber 12 formed by the tube members 10 and 11. Those surfaces of the perforated tube members 10 and 11 that face the annular chamber 12 are each provided with a heat-resistant, fine-mesh screen 13 and 13a to prevent radial escape of granulate. The mesh width of the fine mesh screens should be selected such that the smallest particles present in the fill by virtue of the finite band width of the grain size distribution are still reliably retained.

The exhaust gas is introduced into the filter insert 5, which is oriented parallel to the axis of gravity of the granulate particles, via an inlet nozzle or connector 3, which is arranged tangentially (to homogenize the flow and avoid regions of deflection) on the filter housing 2 in the vicinity of the base plate 2b. While producing a twisting flow, the soot-laden exhaust gas then passes initially through an annular crude or untreated-gas chamber 8, subsequently through the filter insert 5, and then leaves the filter again in purified form via a central cylindrical collecting chamber (purified gas chamber 9) and via an outlet nozzle or connector 4 that is centrally disposed in the top plate 2a (see arrows 26 showing the flow of the exhaust gas).

A second annular chamber 15 is provided above the first annular chamber 12 in the upper region of the filter housing 2. This second annular chamber 15 represents a spreading space for the volume of granulate, which is constantly enriched with ash and therefore expands slightly but continually. This second annular chamber 15 is formed by the inwardly lengthened cylindrical outlet 4 and a supporting ring 16 that serves to support the perforated tube 11. The other perforated tube 10 is supported on the outlet nozzle 4. Both tubes 10 and 11 are connected to the base plate 2b.

The second annular chamber 15 can be supplied with compressed air via a line 17 to compact the fill 6 of granules. The compressed air is taken or tapped from a conventional pressure reducer (not shown) and can be connected or disconnected via a solenoid valve 18. The supplying of compressed air can be actuated by an ultrasonic oscillator (which serves to loosen the granulate) arranged on the base plate 2b of the filter housing 2 (also not shown). The ultrasonic oscillator can obviously also operate alone.

The first annular chamber 12 is provided with a coarse-mesh perforated cylinder electrode 19, which is fixed in its position by insulating spacers 20, for electrical soot removal, which is effected by direct heating of the soot using electric power. In the illustrated embodiment, the spacers 20 are formed by balls provided in hemispherical recesses in the perforated cylinder electrode 19. An electric supply unit is connected to the electrode 19 via an electrical conductor 23 that is guided through the base plate 2b inside an insulator 22 and is connected to the electrode 19. Plate-shaped spacers 21 of ceramic material are provided in the lower region of the annular chamber 12 to prevent the pressure of the electrode 19 from acting on the insulator 22.

Coarse-mesh perforated cylinders 14 and 14a (mesh width about 0.8 mm) are connected directly (inwardly) to the fine-mesh perforated cylinders 13 and 13a (granulate retaining screen) of the annular chamber 12. These coarse mesh perforated cylinders are connected to the ground potential of the applied current source. When suitably designed, this coarse-mesh member 14 and 14a prevents current from reaching the fine-mesh member 13 or 13a by control of potential. Details of this can be derived from FIG. 2.

Figure 2:
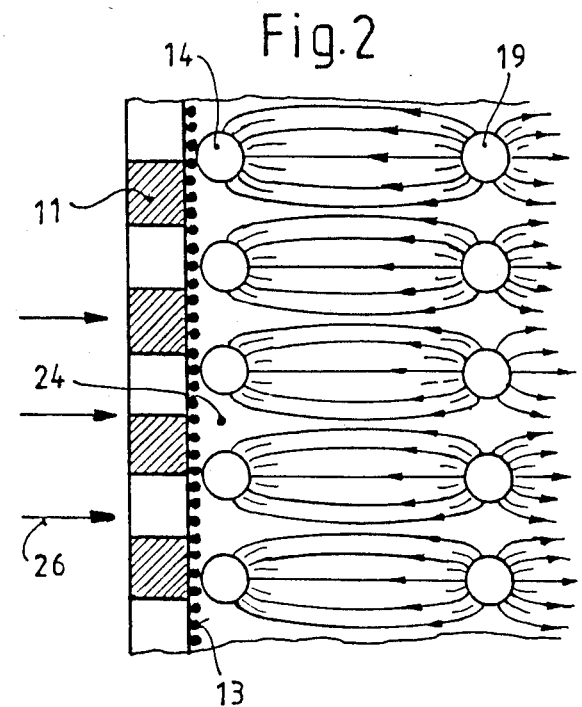
FIG. 2 is an enlarged detail of a portion of the filter insert of FIG. 1, which is approached by the exhaust gas, to illustrate the electrical action in the vicinity of the approached filter surface.

FIG. 2 shows an enlarged detail of the filter insert and diagrammatically reproduces the electrical action in the vicinity of the approached filter surface. The density distribution of the electrical current indicated in FIG. 2 is formed if a macroscopically homogeneous distribution of deposited soot within the granulate is used as a starting point. It is important that a large majority of the field lines end at the wire surface of 14, which can be subjected to higher temperatures. If, on the other hand, these field lines were to end on the filigree retaining screen 13, this screen would be destroyed due to the excessive thermal load (excessively high microscopic electrical power density when forming the ignition path). The smaller the mesh width, i.e. the greater the wire diameter, of the screen 14, the slighter is the risk of "electrical penetration" through the potential-controlling grid of the member 14. On the other hand, the wire diameter should only be as great as required by the current density ratios at the wire surface in the ignition region. This ensures that the volume of the chamber 24 which is free from field lines is kept to a minimum in the desired manner. This also ensures that the electrically started and selfmaintaining burn-up, which travels against the direction of flow, takes care of the chambers 24 up to the retaining screen 13 and prevents them from being clogged with soot. Similarly, a heating current distribution is generated to the perforated wall 14a of the exhaust gas outlet, which is affected by ground potential. Since the soot separation profile forming in the annular chamber 12 forms its peak at the inlet side, it is beneficial to design the diameter of the electrode cylinder 19 such that its radial distance from the inlet side is less than from the outlet side.

Figure 3:
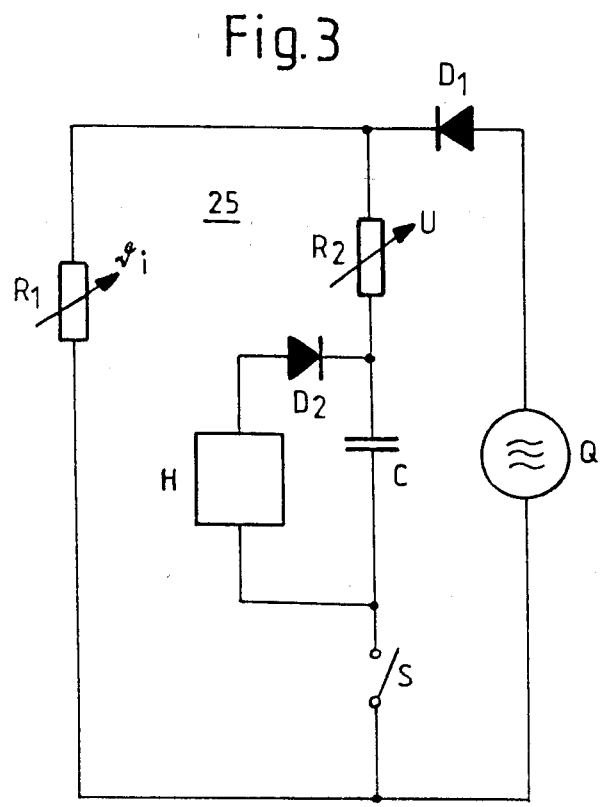
FIG. 3 is an electrical circuit diagram of the control circuit for initiating ignition of electrical soot combustion by means of current supply means operating with impressed power.

An electric circuit arrangement such as illustrated in FIG. 3 serves to initiate electrical soot combustion in a reliable manner.

A surge source 25 has to be connected electrically in parallel with the current source Q which is required in the present case and which operates with impressed power. This surge source 25 essentially comprises a capacitor C that is connected, by means of a timer-controlled switch means S (relay contact or thyristor) and a varistor $R_2$ (voltage sensitive resistor of silicon carbide), to the electrode system of the granular filter, thus in the final analysis to the soot compensating resistor $R_1$.

The capacitor C is kept constantly in the charged state via the decoupling diode $D_2$ by means of the high voltage source H. A further decoupling diode $D_1$ prevents undesirable discharge of the capacitor C into the voltage source Q. A frequency range of from 1 to 0.2 Hz can be adopted for the cycle sequence of the capacitor discharge, and this should be taken into consideration when designing the timer (free running multi vibrator).

The reason for using the surge generator is as follows: if the soot filter is to be started from the fully charged state, this can denote a soot compensating resistor of very low resistance, particularly if the prevalence of soot is due to a prolonged full load phase of the engine.

The "dryness" of the soot emitted denotes the quality thereof. This means the absence of electrically insulating coverings of condensate from hydrocarbons, which would otherwise produce a great transition resistance between the individual soot particles and would lead to relatively high compensating resistances even in the case of a high separating density of "wet soot" (partial load state of the engine). These transition resistances are missing in the previously mentioned case of dry soot, however, and this explains the abovementioned low resistance.

However, since the power supply unit Q, which operates with impressed power (which is synonymous with restricted in current) is capable of transmitting only low currents (which are quite sufficient for maintaining the so-called "combustion zone"), it is consequently incapable of producing such a power density within the almost homogeneous local distribution of the soot resistor in order to ensure heating until a combustion zone is formed.

With an auxiliary current source—as represented by the capacitor C—which produces such a high current density in the soot deposit for a very short time that the formation of the combustion zone is started, the problem mentioned above can effectively be avoided (the formation of the combustion zone is due, on the one hand, to the microinhomogeneity of the resistance distribution before the moment of ignition and, on the other hand, to the negative temperature coefficient of the specific electric resistance of soot which locally concentrates the current distribution). If the combustion zone is produced in this way, it represents a discontinuous point of extremely low resistance in the resistance distribution between the electrode surfaces which, due to the negative temperature coefficient of the specific electric resistance, cumulatively develops the property of combining electrical energy from regions outside the combustion zone on itself, and of increasing the energy conversion such as the temperature in the shortest time so that thermal destruction of the respective combustion zone must be taken into consideration if a reduction in current has not previously been allowed for.

To avoid destruction of this type in a reliable manner, it is necessary to influence the progression of the capacitor discharge current with time as follows: a brief peak current initially produces the combustion zone; immediately thereafter, this current should fall to such values that the combustion zone is just maintained with its current concentration effect but at a local energy conversion which ensures thermal compatibility with the environment.

The drop in the current value to zero with time should be characterized by a time period that is greater than the reciprocal of the pulse output frequency of the current supply Q.

This ensures that the combustion zone is maintained because the energy production therein is taken over by the current originating from the current production unit Q. The above-mentioned progression of the surge can be forced by guiding the discharge current via the varistor $R_2$. The peculiarity of this resistor of silicon carbide resides in the fact that its momentary resistance value is a function of the momentary discharge voltage at the capacitor C. High initial load voltage of the capacitor denotes low resistance value of $R_2$, that is to say, high desired surge;; decreasing load voltage results in increasing resistance and therefore lower but longer lasting current (compare with discharge via normal resistor with a constant resistance value).

Due to the finite value of the combustion zone compensating resistance, which is also dependent on current, it should be anticipated that for very large volumes of granulate enclosed by the electrode surfaces, the soot compensating resistance of the unignited soot deposit is lower than the compensating resistance of the ignition zone, providing that the ignition zone is supplied by the heating current which is the highest permitted in terms of heat.

With such a system, it is not possible to produce a combustion zone with surge current source because thermal destruction would otherwise have to be anticipated. Assistance can be gained by dividing the system into several electrically separated electrode zones which, in turn, can be connected in a rapid time sequence (in endless repetition) by means of timer-controlled changeover devices (for example relay chain) to the parallel circuit comprising the power supply unit Q and the surge unit. The division of the electrode surface into several smaller portions of equal area can be effected by dividing the filter into several granular filter units which are connected in parallel in terms of flow, and are disposed in a common filter housing. Each filter element simultaneously represents a partial electrode surface which can be connected. This may also be worthwhile for reasons of shaping.

Reference is finally made to a further application of the compressed air shutdown, for example in those operating states of a Diesel engine characterized by such slight soot emission that filtering would not legally be required. If the engine were driven with loosened granulate during such operating states, this would mean slighter losses in the engine in the desired manner due to the lower pressure drop in the filter. It would be conceivable to actuate the filter in this sense, by performance characteristic control using the solenoid, only when actually required.

An electrostatic coagulator could also be used in addition to the filter, upstream of the filter. The filter could be dimensioned to allow slighter pressure drops in the granular substance due to the resultant formation of agglomerated materials (fresh particles of soot having considerably larger diameters are formed from the particles of soot primarily formed at the outlet of the engine).

This can be effected either by reducing the annular chamber 12—while maintaining the grain diameter—or by using larger grain diameters while maintaining the size of the annular chamber (average microscopic pore diameter may be greater). The first-mentioned method has the advantage of reducing the weight, and the second method results in retaining screens 13 and 13a that have a coarser mesh size and are therefore more stable.

The present invention is, of course, in no way restricted to the specific disclosure of the specification and drawings, but also encompasses any modifications within the scope of the appended claims.

WHAT I CLAIM IS:

1. In an apparatus for removing soot from the exhaust gases of an internal combustion engine, especially a Diesel engine, said apparatus including a metallic housing having inlet and outlet means for the exhaust gas stream, and a filter insert that is disposed in said housing and contains a non-metallic, high-temperature-resistant filter means in the form of a granulate fill that is disposed in a fixing element, with said filter insert, in said filter housing, separating an untreated-gas chamber, which communicates with said inlet means, from a purified-gas chamber, which communicates with said outlet means, and with an electrical current source being used to burn off, in a controlled manner, the soot deposited on said filter means, the improvement wherein: said fixing element of said filter insert comprises two vertically and coaxially disposed perforated tube members that form between them a first annular chamber for accommodating said granulate fill and receiving untreated gas from said untreated-gas chamber, said first annular chamber also communicating with said purified-gas chamber, with said perforated tube members having surfaces that face said first annular chamber, said surfaces being provided with a respective fine-mesh screen, and inwardly thereof and adjacent thereto, a respective coarse-mesh screen, said exhaust gas being adapted to flow through said filter insert transverse to the gravitational effect of the particles of said granulate fill; an upper region of said filter housing is provided with a second annular chamber that communicates with said first annular chamber, with means being provided for supplying compressed air to said second annular chamber for being able to compact said granulate fill of said first annular chamber.

2. An apparatus according to claim 1, in which said filter housing Includes a base plate, remote from said second annular chamber, for supporting said tube members; and which includes an ultrasonic vibrator that is disposed on said base plate and is adapted to be coupled to said compressed-air supply means, which includes a pressure reducer, a valve, and a line that leads to said second annular chamber.

3. An apparatus according to claim 1, in which said filter housing includes a base plate, remote from said second annular chamber, for supporting said tube members; and in which, for electrical removal of soot deposited on said filter means, said first annular chamber is provided with a perforated cylinder electrode disposed near that coarse-mesh screen closest to said untreated-gas chamber, yet remote from the latter, with insulating spacers holding said electrode in place; an electrical supply line connects said electrode to said electrical current source, and is guided through an insulator disposed in said base plate; ceramic plates disposed in the vicinity of said base plate provide support for said electrode and relieve pressure on said insulator.

4. An apparatus according to claim 3, in which said coarse-mesh screens assume the electrode function for the ground potential and at the same time prevent current from reaching said fine-mesh screens by controlling potential.

5. An apparatus according to claim 4, in which said electrical current source that is connected to said electrode and said coarse-mesh screens operates with impressed power, said current source furthermore being connected in parallel with a surge unit via a first diode.

6. An apparatus according to claim 5, in which said surge unit essentially comprises a capacitor that is supplied from a high voltage source via a second diode, said capacitor being connected via a timer-controlled switch means and via a varistor to the electrode system of said filter insert, and being connected in parallel with a momentary soot compensating resistor.

7. An apparatus according to claim 6, in which said switch means is in the form of a relay contact or thyristor, and said varistor is a voltage sensitive resistor of silicon carbide.

* * * * *